United States Patent [19]

Ishihara

[11] Patent Number: 5,574,520
[45] Date of Patent: Nov. 12, 1996

[54] CAMERA CHANGING MAGNETIC RECORDING UPON DETECTION OF ABNORMAL CAMERA STATE

[75] Inventor: Masaaki Ishihara, Kanagawa-ken, Japan

[73] Assignee: Canon Kabushiki Kaisha, Tokyo, Japan

[21] Appl. No.: 446,236

[22] Filed: May 22, 1995

[30] Foreign Application Priority Data

May 25, 1994 [JP] Japan ........................... 6-133888

[51] Int. Cl.⁶ .................................. G03B 17/24
[52] U.S. Cl. .............................. 396/52; 396/311; 396/319
[58] Field of Search .................... 354/21, 105, 106, 354/266

[56] References Cited

U.S. PATENT DOCUMENTS 5,499,068  3/1996  Satoh et al. ........................ 354/106

Primary Examiner—Howard B. Blankenship
Attorney, Agent, or Firm—Robin, Blecker, Daley & Driscoll

[57] ABSTRACT

A camera of the kind having a function of recording information designating an arbitrary number of prints in a magnetic recording track provided for each of frame portions of a film is arranged to inhibit the information designating the arbitrary number of prints from being recorded in the magnetic recording track of any frame for which a picture has been taken under an abnormal shooting condition, such as a camera shake.

19 Claims, 14 Drawing Sheets

CAMERA CHANGING MAGNETIC RECORDING UPON DETECTION OF ABNORMAL CAMERA STATE

BACKGROUND OF THE INVENTION

1. Field of the Invention

This invention relates to a camera adapted for taking pictures on a film having a magnetic storage part and more particularly to a camera arranged to permit, in shooting, designation of a desired number of prints in printing on the printing paper.

2. Description of the Related Art

A camera arranged to blank-feed any frame that is accidentally exposed with a cartridge chamber lid inadvertently opened while shooting is still in process and to record a printing inhibiting signal at such a frame to prevent any unacceptable print from being uselessly prepared, has been disclosed in Japanese Laid-Open Patent Application No. HEI 4-304437.

Meanwhile, a camera arranged to inhibit magnetic recording on a film upon detection of an abnormal state of the camera has been disclosed in Japanese Laid-Open Patent Application No. HEI 5-34802.

Further, a camera arranged either to give a warning or to carry out recording once again when a camera shake is detected while magnetic recording on a film is in process has been disclosed in Japanese Laid-Open Patent Application No. HEI 4-158346.

However, the camera disclosed in Japanese Laid-Open Patent Application No. HEI 4-304437 is incapable of preventing the print preparation work on a frame for which some abnormality occurs while shooting is in process, although any frame that is exposed by inadvertently opening the cartridge chamber lid can be prevented from being uselessly printed.

The camera disclosed in Japanese Laid-Open Patent Application No. HEI 5-34802 is arranged to inhibit magnetic recording on the film when an abnormal state of the camera is detected. Therefore, although printing can be prevented from being carried out on any erroneous printing condition when erroneous information is recorded on the film, it is impossible to prevent print preparing work on a frame for which no print is required because the picture is taken while the camera is in an abnormal state.

In the case of the camera disclosed in Japanese Laid-Open Patent Application No. HEI 4-158346 and arranged either to give a warning or to do rerecording in the event of detection of shakes or vibrations in the process of magnetic recording on the film, this arrangement is made for detection of an abnormality of the camera taking place during the process of magnetic recording, i.e., during the process of transporting the film. The camera is, therefore, incapable of detecting any abnormality of the camera taking place while shooting is in process.

SUMMARY OF THE INVENTION

It is one aspect of the invention under the present application to provide a camera which is capable of preventing useless preparation of prints by causing information designating the number of prints as "0" or "1" to be recorded on a film in cases where any abnormal shooting condition is detected.

It is another aspect of the invention to provide a camera which is capable of not only preventing useless preparation of prints but also giving a warning to the photographer by causing information designating the number of prints as "0" or "1" to be recorded on a film and by causing warning means to give a warning if any abnormal shooting condition is detected.

It is a further aspect of the invention to provide a camera which is arranged to be easily operable by enabling the photographer either to inhibit or to allow the operation of control means for causing information designating the number of prints as "0" or "1" to be recorded on a film if any abnormality is detected in the shooting conditions of the camera.

It is a further aspect of the invention to provide a camera arranged to enable the photographer to selectively decide, for every frame, whether information designating the number of prints as "0" or "1" is to be rewritten to information designating the number of prints as "1" or more, after the information designating the number of prints as "0" or "1" has been recorded on a film with some abnormal shooting condition of the camera detected, so that pictures of any desired frames can be printed even in cases where shots are taken under abnormal shooting conditions.

It is a still further aspect of the invention to provide a camera which is arranged to record information about a desired number of prints in the magnetic storage part of each frame and to permit cancellation of the recorded information selectively for every one of frames.

These and other aspects and features of the invention will become apparent from the following detailed description of embodiments thereof taken in connection with the accompanying drawings.

DETAILED DESCRIPTION OF THE PREFERRED EMBODIMENTS

Some of preferred embodiments of the invention are described by way of example below with reference to the accompanying drawings.

Figure 1:
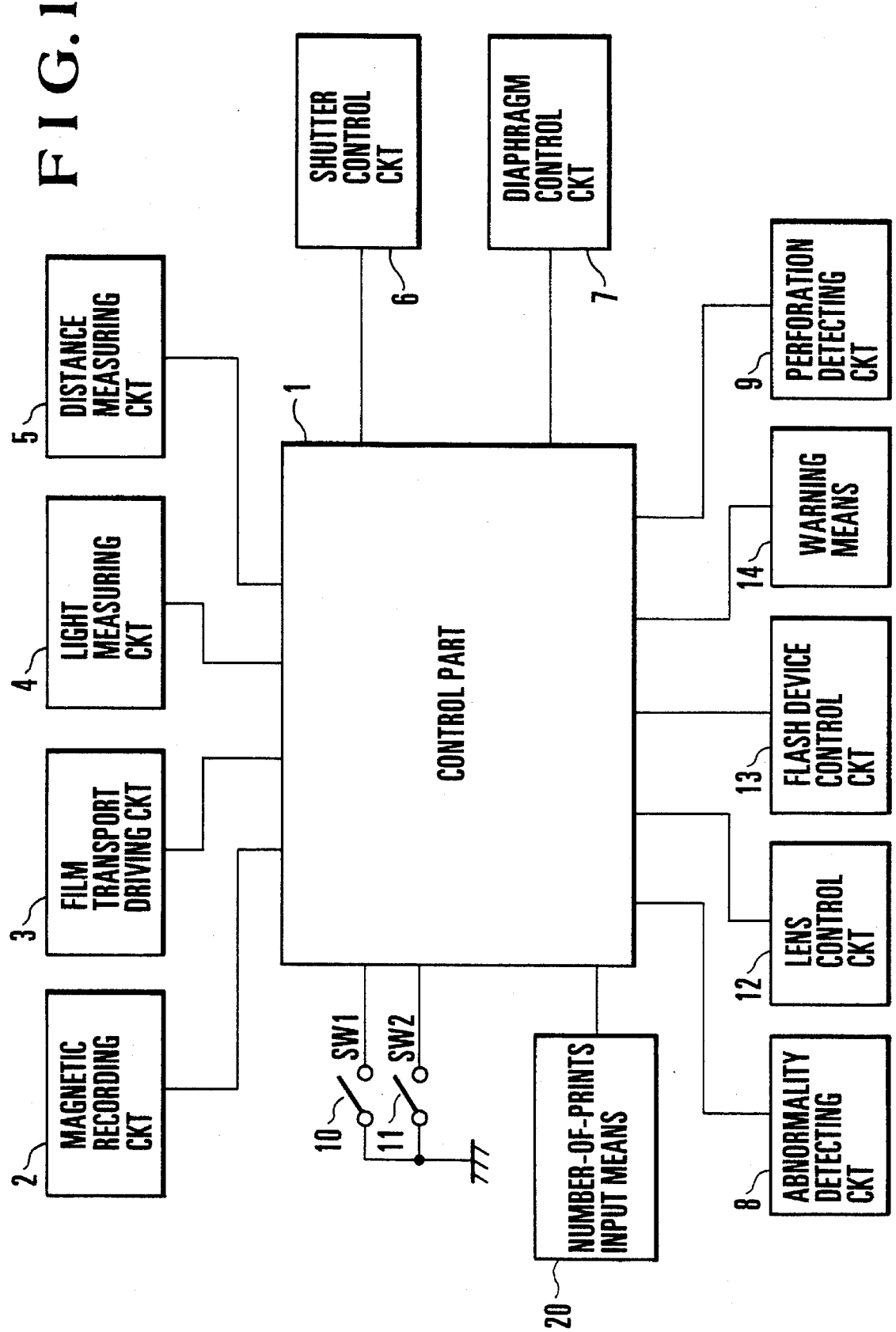
FIG. 1 is a block diagram showing the electric circuit of a camera arranged according to the invention as a first embodiment thereof.
Figure 2:
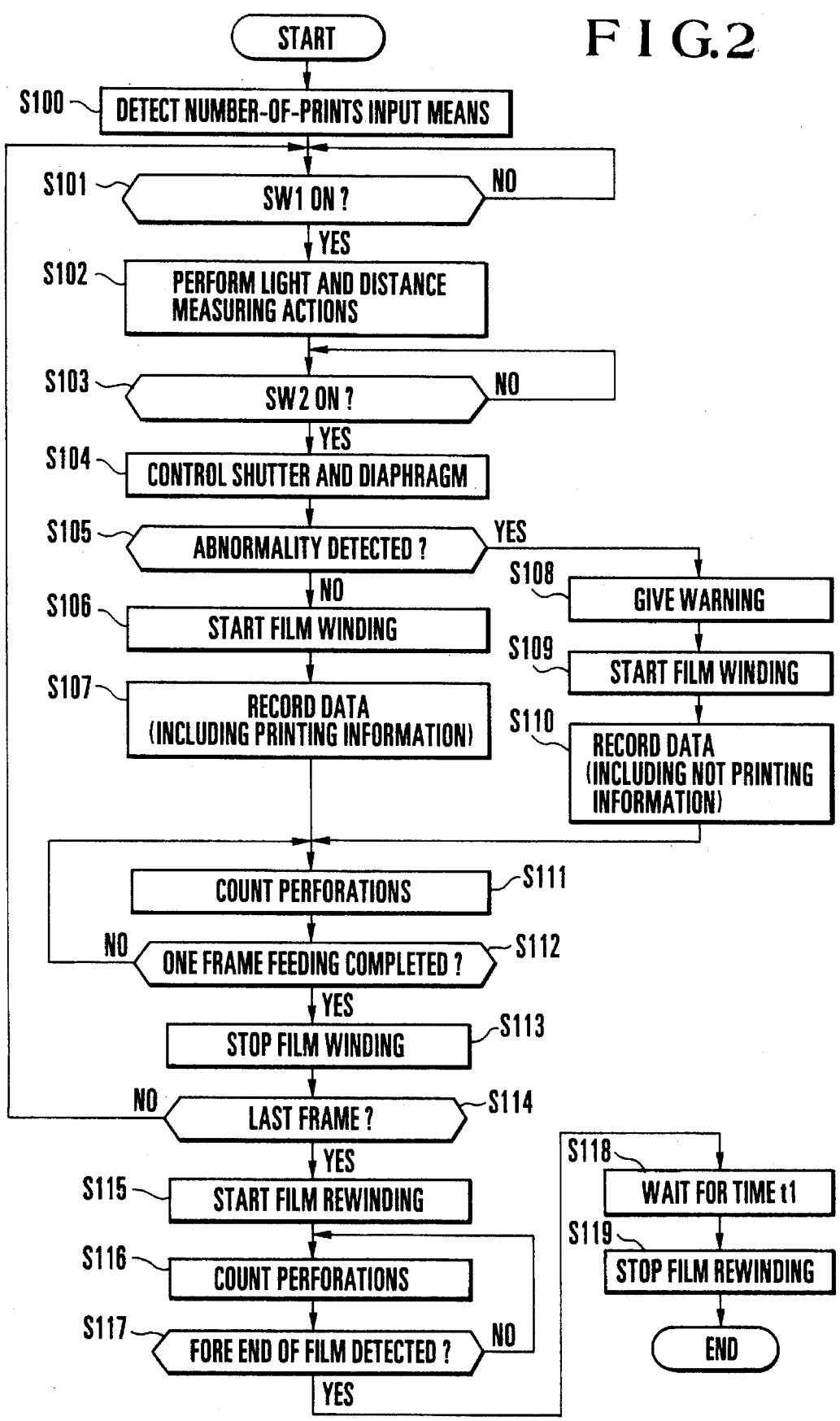
FIG. 2 is a flow chart showing the operation of the camera shown in FIG. 1.

FIGS. 1 and 2 show a camera which is arranged as a first embodiment of the invention. FIG. 1 is a block diagram showing the electric circuit of the camera. FIG. 2 is a flow chart showing the operation of the camera.

Referring to FIG. 1, the operation of the whole camera is controlled by a control part 1 which is composed of a microcomputer, etc. A light measuring switch (SW1) 10 and an exposure switch (SW2) 11 are arranged to be turned on respectively by first and second strokes of the same switch member. When the light measuring switch 10 is first turned on, a light measuring circuit 4 begins a light measuring action and a distance measuring circuit 5 begins a distance measuring action.

A lens control circuit 12 controls a focusing lens on the basis of data of distance measured by the distance measuring circuit 5. When the exposure switch 11 is turned on by the second stroke of the switch member, an exposure is made by driving a shutter control circuit 6 and a diaphragm control circuit 7 according to a shutter time and an aperture value obtained on the basis of data of light measured by the light measuring circuit 4. In a case where flash photography is to be carried out using a flash device which is either built in the camera or mounted on the camera, flashing of the flash device is controlled by a flash device control circuit 13.

When an abnormal shooting condition is detected by an abnormality detecting circuit 8, a warning is given by a warning means 14. More specifically, the warning means 14 is arranged to make a display with an LED, a liquid crystal or the like or to generate a sound with a buzzer, a speaker or the like.

Further, the abnormality detecting circuit 8 is arranged to be capable of detecting abnormal shooting conditions obtained in cases where an exposure made by the shutter control circuit 6 and the diaphragm control circuit 7 is an over-exposure or under-exposure, where the shooting distance of the focusing lens controlled by the lens control circuit 12 is not matched with an object, where the flash device has failed to flash under the control of the flash device control circuit 13, where a capacitor disposed within the camera or within the flash device has not been fully charged when a flashing action is performed and where a camera shake happens to take place when the camera is in process of shooting.

The abnormality detecting circuit 8 includes, for example, a comparison circuit which is arranged to detect whether an exposure value EV based on a luminance measured by the light measuring circuit 4 is higher or lower than a predetermined value; a distance measurement output detecting circuit which is arranged to find if an object distance measured by the distance measuring circuit 5 is nearer than a limit distance set on the side of near shooting distances under the control of the lens control circuit 12 and, if so, to output an abnormality signal; a flashing control part which is arranged to detect the charged level of the capacitor of the flash device and to output an abnormality signal when shooting is made by flash photography before completion of a charging action on the capacitor; and a shake detecting circuit which is arranged to detect with a shake sensor any shake that takes place during shooting and to output an abnormality signal when the detection output of the sensor exceeds a predetermined value.

Upon completion of a shutter release, a film transport driving circuit 3 drives a film transport motor (not shown) to carry out a film winding or rewinding action. During the process of film winding, a magnetic recording circuit 2 controls a magnetic head (not shown) to cause the magnetic head to write or read information into or from a magnetic storage part provided on the film.

A perforation detecting circuit 9 is arranged to confirm frame feeding by detecting perforations provided in the film through a photo-reflector or the like. In a case where the photographer wishes to input information designating the number of prints as "1" or more, a number-of-prints input means 20 is operated for this purpose.

Referring to FIG. 2 which is a flow chart, the operation of the first embodiment is described as follows:

At a step S100, a check is made for an input made by the number-of-prints input means 20 designating the number of prints. At a next step S101, a check is made to find if the switch 10 (SW1) is in an on-state. If so, the flow of operation comes to a step S102. At the step S102, the light measuring circuit 4 and the distance measuring circuit 5 are activated to perform light and distance measuring actions. If not, the flow comes back to the step S101.

At a step S103, a check is made to find if the switch 11 (SW2) is in an on-state. If so, the flow comes to a step S104 to cause the shutter control circuit 6 and the diaphragm control circuit 7 to perform an exposure action. If not, the flow comes back to the step S103.

At a step S105, a check is made for any abnormal shooting condition detected by the abnormality detecting circuit 8. If any abnormal shooting condition is detected, the flow comes to a step S108.

At the step S108, a warning is given by the warning means 14. At a step S109, the film transport driving circuit 3 drives the film transport motor to begin film winding. At a step S110, shooting conditions, arbitrary comments and information designating the number of prints as "0" or "1" are recorded together, or only the information designating the number of prints as "0" or "1" is alone recorded, by the magnetic recording circuit 3 in the magnetic storage part provided at each frame on the film.

In a case where no abnormal shooting condition is detected by the check made at the step S105, the flow comes to a step S106. At the step S106, the film transport driving circuit 3 causes the film transport motor to begin film winding. At a step S107, shooting conditions, arbitrary comments and the information designating the number of prints as "1" or more detected by the step S100 are recorded by the magnetic recording circuit 2 in the magnetic storage part provided for each frame of the film.

At a step S111, the perforation detecting circuit 9 counts the number of perforations. At a step S112, a check is made to find if the number of perforations corresponding to one frame has been counted. If so, the flow comes to a step S113 to cause the film transport driving circuit 3 to stop the film transport motor from film winding. If not, the flow comes back to the step S111.

At a step S114, a check is made to find if the frame for which a shot has been taken is the last frame of the film. If not, the flow comes back to repeat the steps S101 to S113. If so, the flow comes to a step S115 to cause the film transport driving circuit 3 to drive the film transport motor so as to begin film rewinding. At a step S116, the perforation detecting circuit 9 counts the perforations of the film.

At a step S117, a check is made to find if the perforation detecting circuit 9 has detected the passing of the fore end of the film with all the frame portions of the film having been rewound. If so, the flow comes to a step S118 to wait for the lapse of a timer time t1. The flow then comes to a step S119 to cause the film transport driving circuit 3 to bring the film transport motor to a stop. The timer time t1 in the step S118 is set at a length of time necessary for having the film completely wound back into the film cartridge.

The embodiment is provided with the abnormality detecting circuit 8 for detecting, as mentioned above, abnormalities such as an inadequate exposure, a focus deviation, inadequate flashing of the flash device, camera shakes, etc. Upon detection of such abnormalities, the embodiment not only gives a warning to the photographer but also automatically records, on the film, information designating the number of prints as "0" or "1", so that the preparation of an unacceptable print can be automatically prevented.

Figure 3:
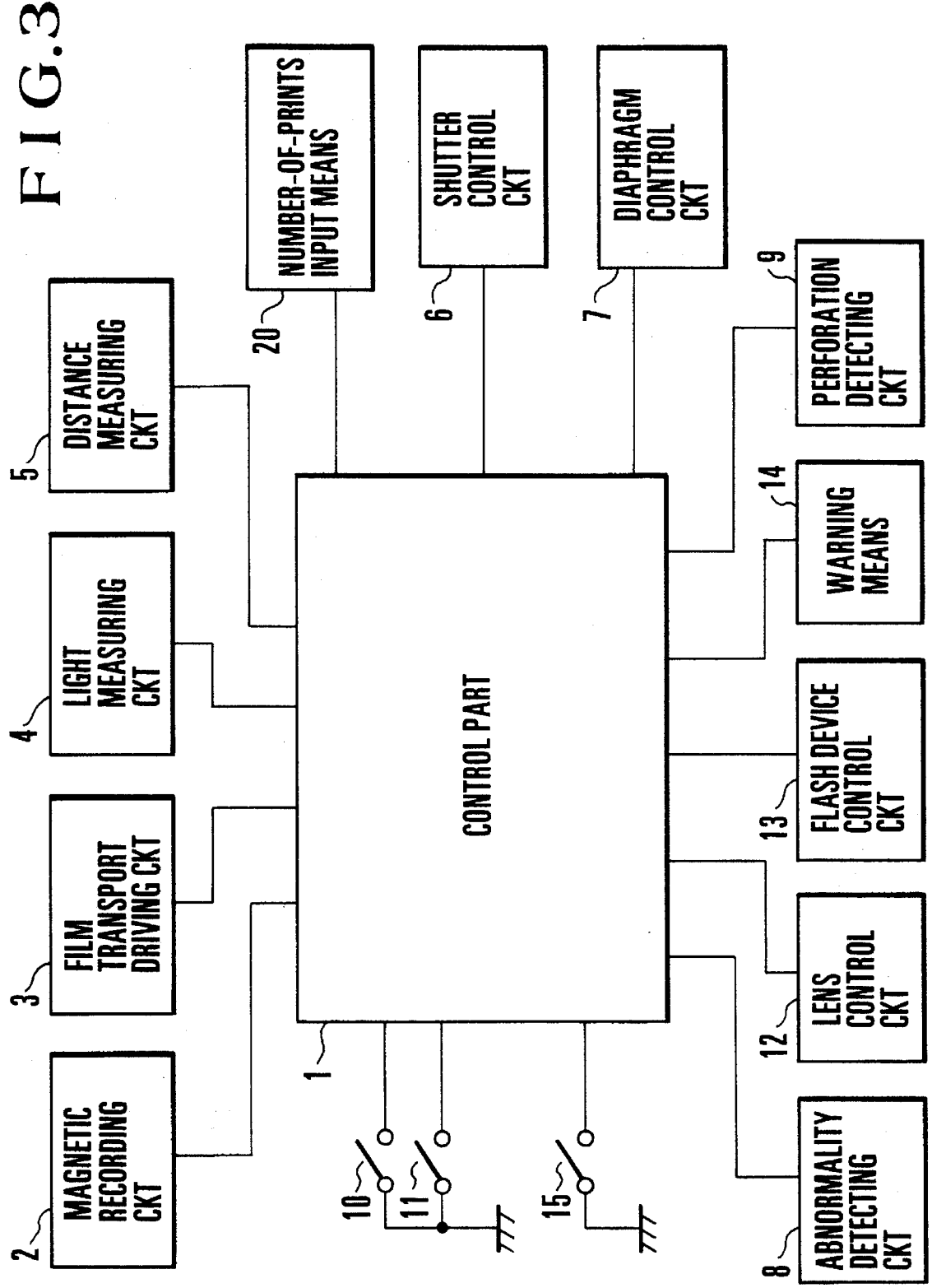
FIG. 3 is a block diagram showing the electric circuit of a camera arranged according to the invention as a second embodiment thereof.
Figure 4:
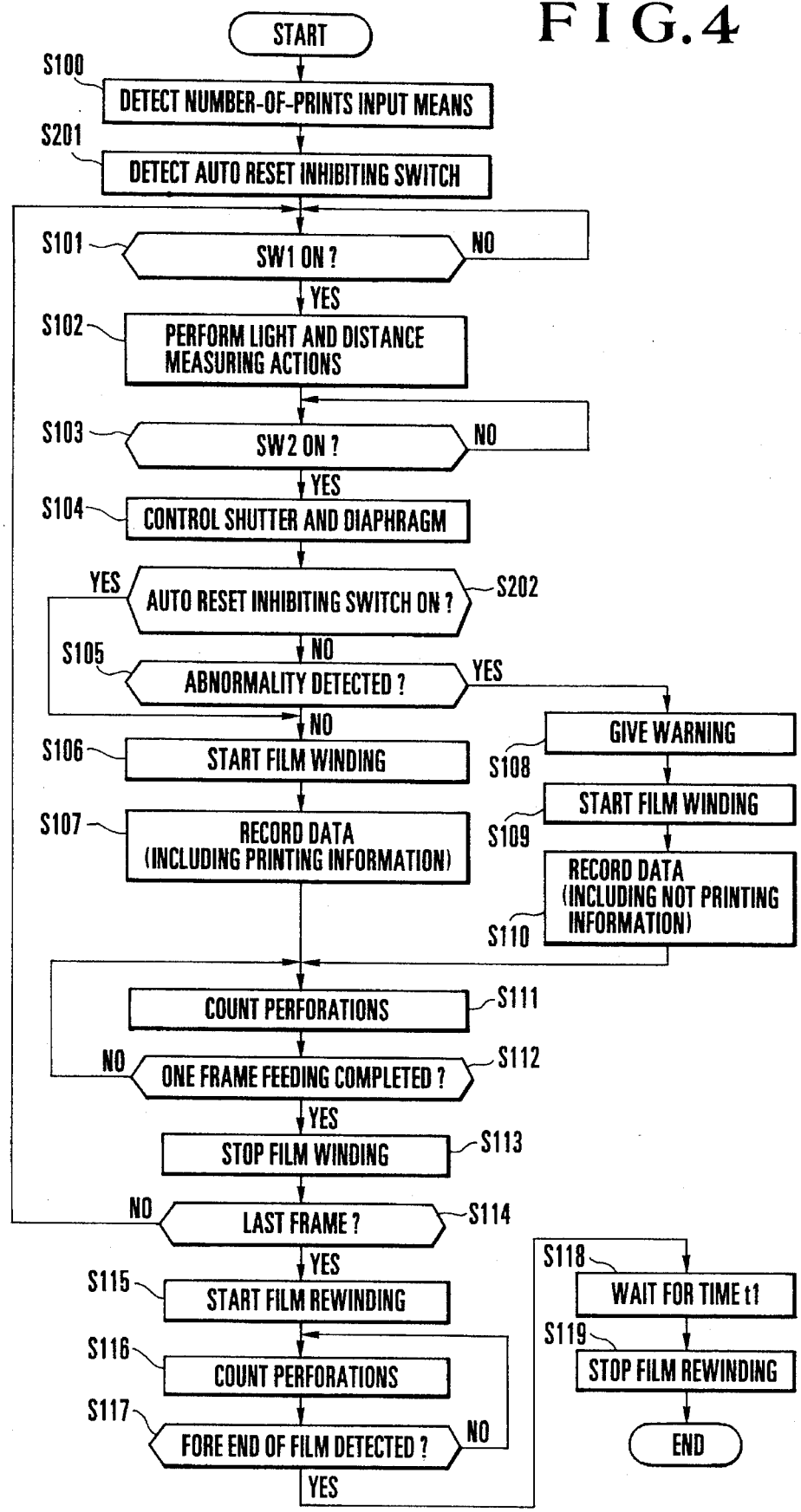
FIG. 4 is a flow chart showing the operation of the camera shown in FIG. 3.

A camera which is a second embodiment of the invention is next described as follows: FIG. 3 is a block diagram showing an electric circuit of the camera. FIG. 4 is a flow chart showing the operation of the camera.

Referring to FIG. 3, the second embodiment is provided with an automatic reset inhibiting switch 15. The automatic reset inhibiting switch 15 is arranged to inhibit the function of preventing preparation of any inadequate print (hereinafter referred to as automatic reset function) by magnetically recording, in the magnetic storage part of the film, shooting data including information designating the number of prints as "0" or "1", automatically when an abnormal shooting condition of the camera is detected by the abnormality detecting circuit 8. The automatic reset function is inhibited when the automatic reset inhibiting switch 15 is turned on.

With the exception of this, all other parts of the second embodiment are arranged in the same manner as those of the first embodiment and, therefore, details of them are omitted from the following description.

The operation of the second embodiment is described with reference to the flow chart of FIG. 4 as follows: In the flow chart, the same processes as those of the first embodiment are indicated by the same step numbers and are omitted from the following description, which is limited to such processes that differ from the flow chart of FIG. 2.

Referring to FIG. 4, after the step S100 which is provided for detection of the state of the number-of-prints input means 20, the flow comes to a step S201 to detect the state of the automatic reset inhibiting switch 15. At a step S202, a check is made to find if the state of the automatic reset inhibiting switch 15 detected by the step S201 has been an on-state after a series of release actions has been carried out. If the state of the automatic reset inhibiting switch 15 has been an on-state, the flow jumps to the film winding step S106 without executing the step S105 of making the check for abnormality detection. If the switch 15 is found to have been in an off-state, the flow comes to the abnormality detection checking step S105. The steps subsequent to the step S105 are exactly the same as those of the first embodiment.

As described above, the second embodiment is arranged to enable the photographer to selectively use the automatic reset function as desired.

Figure 5:
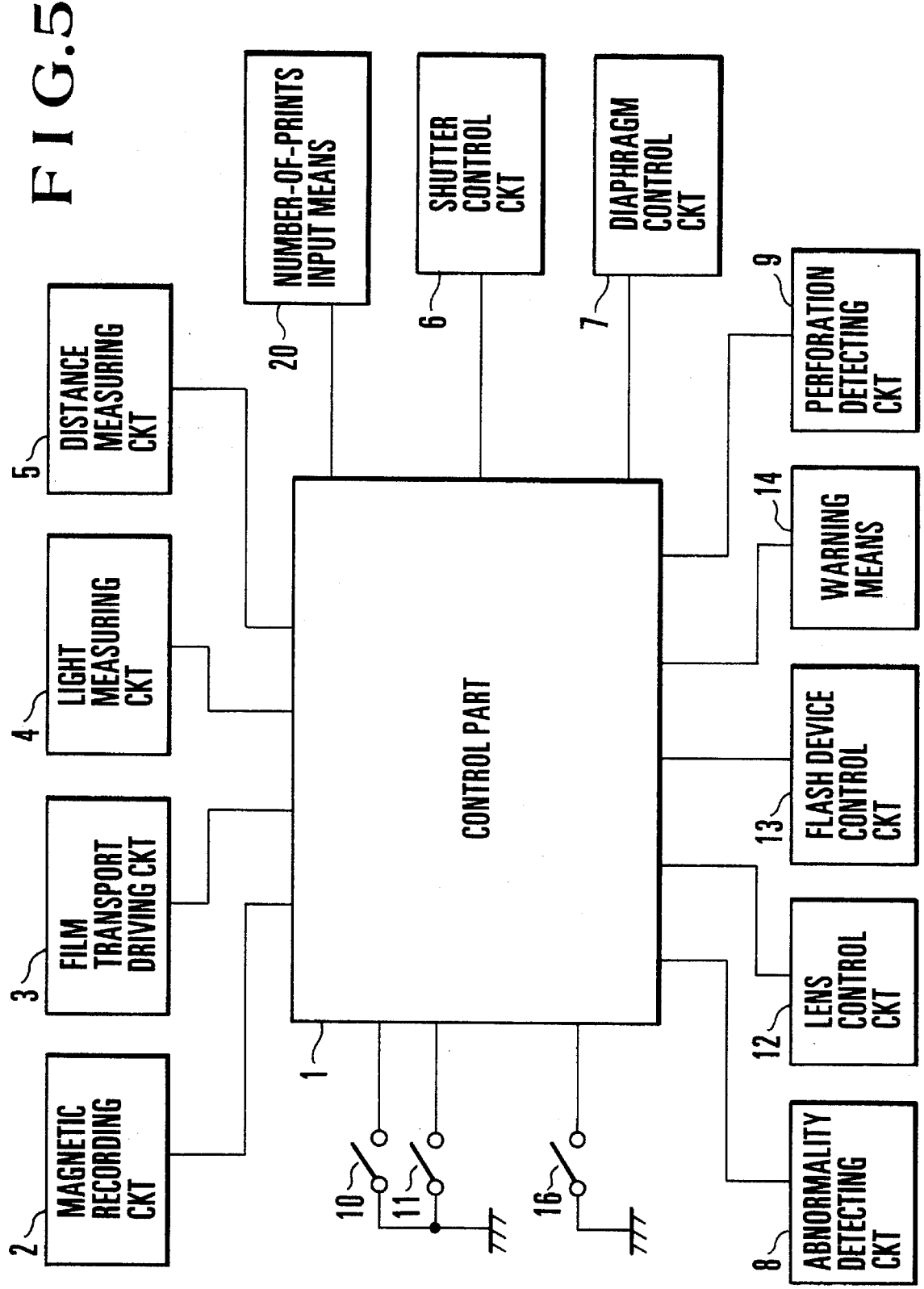
FIG. 5 is a block diagram showing the electric circuit of a camera arranged according to the invention as a third embodiment thereof.
Figure 6:
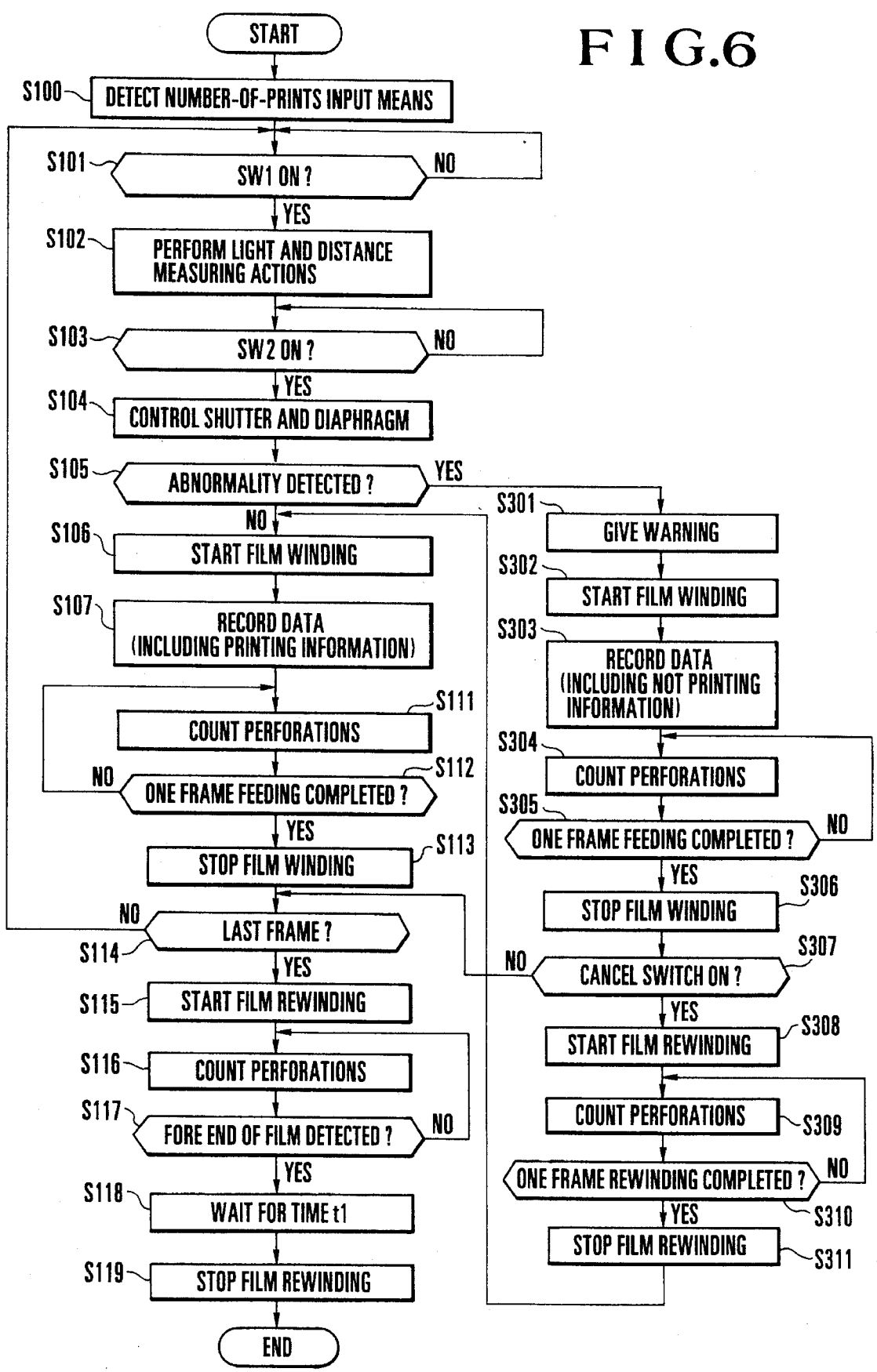
FIG. 6 is a flow chart showing the operation of the camera shown in FIG. 5.

A third embodiment of the invention is described as follows: FIGS. 5 and 6 relate to a camera which is arranged as the third embodiment of the invention. FIG. 5 is a block diagram showing the electric circuit of the camera. FIG. 6 is a flow chart showing its operation.

Referring to FIG. 5, the camera is provided with an automatic reset cancel switch 16. This switch 16 is arranged as follows: With some abnormal shooting condition detected by the abnormality detecting circuit 8, after the automatic reset function is automatically performed to magnetically record in the magnetic storage part of the film the data including information designating the number of prints as "0" or "1", the automatic reset cancel switch 16 acts to magnetically record again in the magnetic storage part the number of prints detected by the step S100. When the automatic reset cancel switch 16 is turned on, the switch 16 acts to cancel the automatic reset function.

With the exception of the above arrangement, all other parts are arranged in the same manner as those of the first embodiment and indicated by the same reference numerals in FIG. 5. They are therefore omitted from the following description. In the flow chart of FIG. 6, the same processes and actions which are the same as those of the first embodiment shown in FIG. 2 are indicated by the same step numbers and the details of them are also omitted from the following description, which is limited to processes differing from the flow chart of FIG. 2.

Referring to FIG. 6, when some abnormality is detected by the abnormality detecting check at the step S105, the flow comes to a step S301. At the step S301, a warning is given by the warning means 14. At a step S302, the film transport driving circuit 3 drives the film transport motor to begin film winding.

At a step S303, the magnetic recording circuit 2 is caused to record, in the magnetic storage part provided at each frame portion of the film, shooting conditions, arbitrary comments and information designating the number of prints as "0" or "1", or only the information designating the number of prints as "0" or "1". At a step S304, the perforation detecting circuit 9 is caused to count the perforations of the film.

At a step S305, a check is made to find if the number of perforations corresponding to one frame has been counted. If so, the flow comes to a step S306 to cause the film transport driving circuit 3 to stop the film transport motor from film winding. If not, the flow comes back to the process of the step S304.

At the step S307, a check is made to find if the automatic reset cancel switch 16 is in an on-state. If not, the flow proceeds to the step S114. If so, the flow comes to a step S308. At the step S308, the film transport driving circuit 3 is caused to drive the film transport motor to begin film rewinding. At a step S309, the perforation detecting circuit 9 is caused to count the number of perforations of the film. At a step S310, a check is made to find if the number of perforations corresponding to one frame portion of the film has been counted. If so, the flow comes to a step S311.

At the step S311, the film transport driving circuit 3 is caused to stop the film transport motor from film rewinding. The flow then proceeds to the step S106. At the step S106, film winding begins. At the step S107, the information designating the number of prints as "1" or more detected by the step S100 is again recorded. If the result of the check made at the step S310 is negative, the flow comes back to the step S309.

In the case of the third embodiment, whether or not the information designating the number of prints as "1" or more is to be rewritten can be selectively decided for every frame. Therefore, any frame that the photographer wishes to be printed can be printed.

Figure 7:
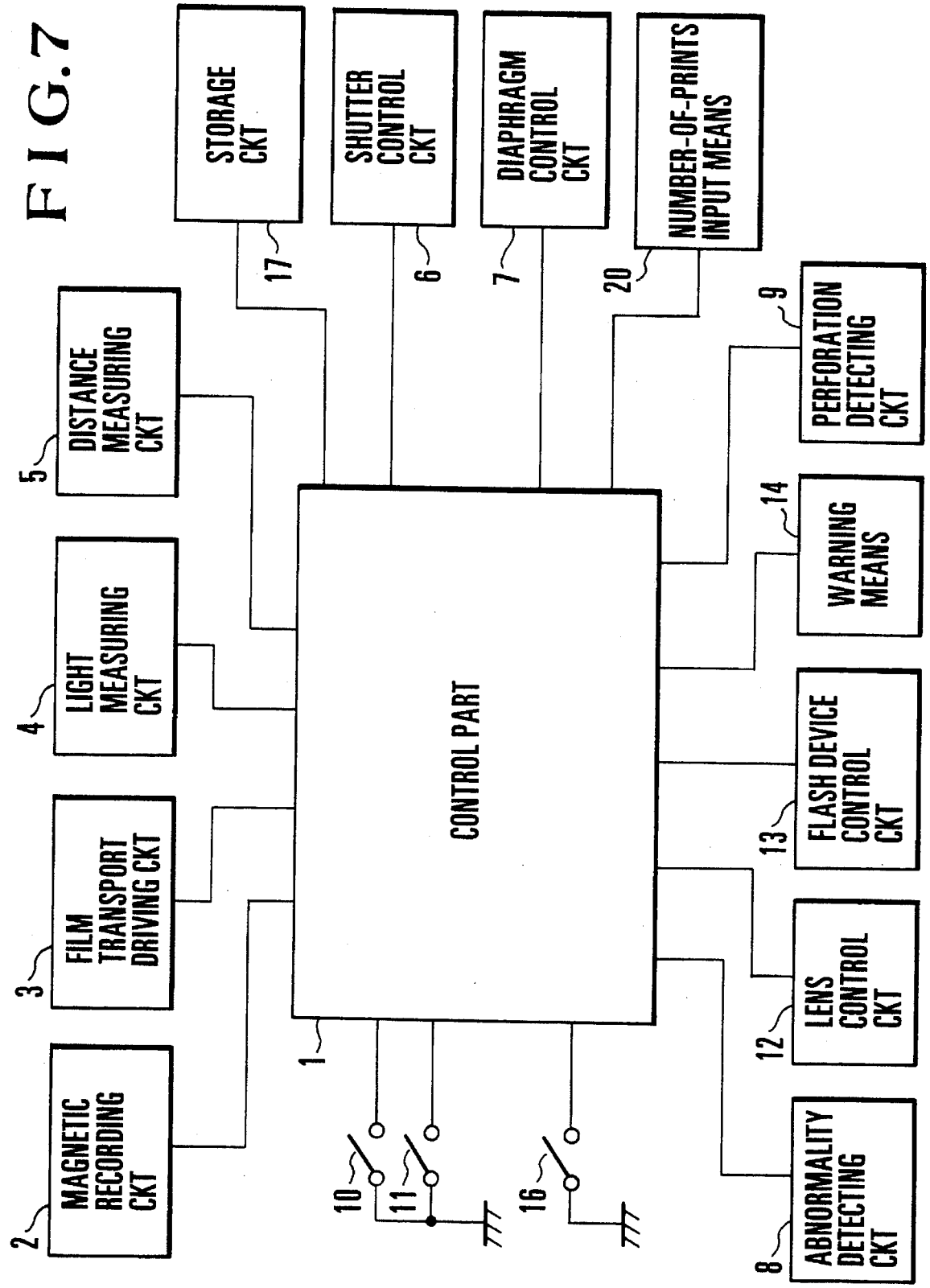
FIG. 7 is a block diagram showing the electric circuit of a camera arranged according to the invention as a fourth embodiment thereof.
Figure 8:
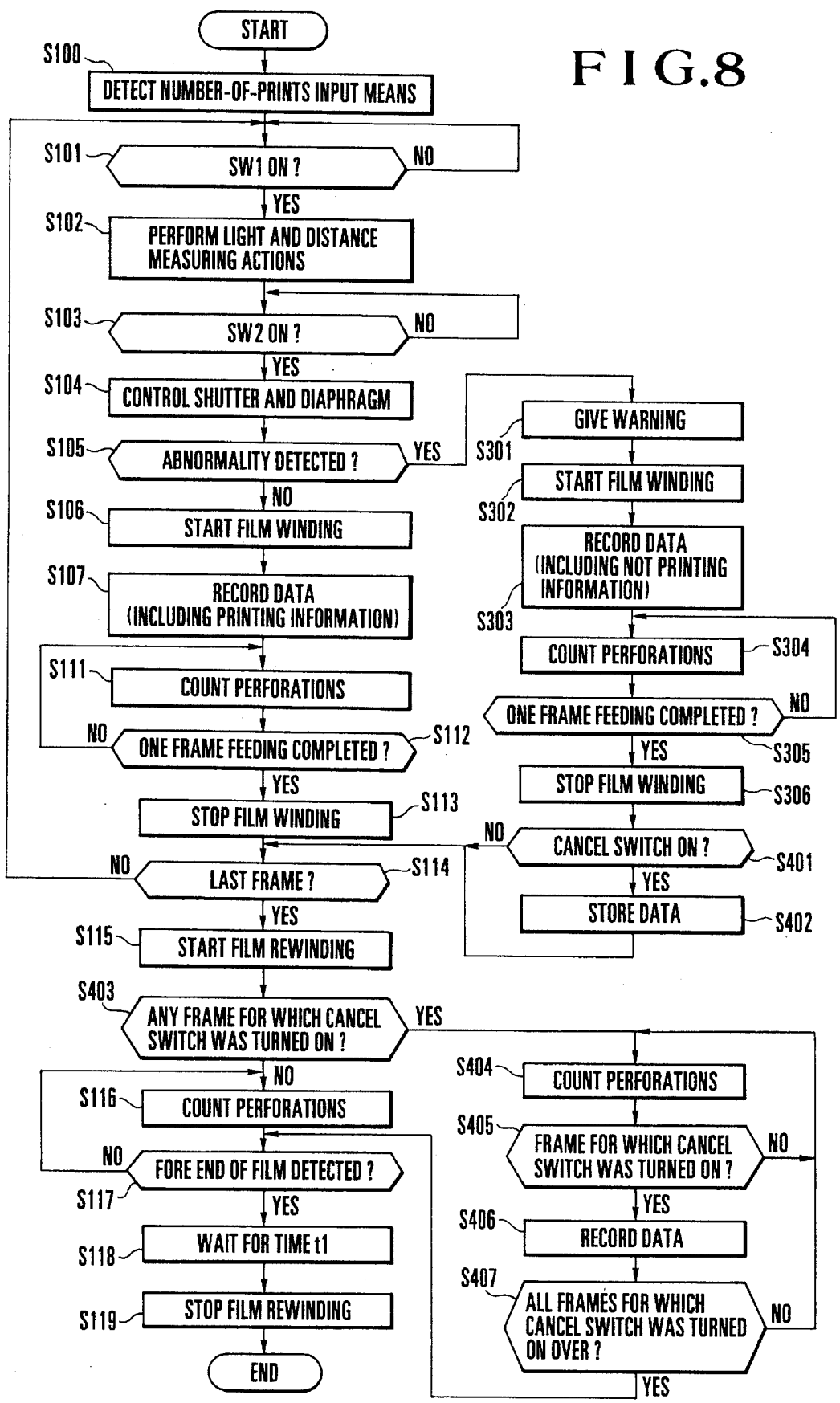
FIG. 8 is a flow chart showing the operation of the camera shown in FIG. 7.

A fourth embodiment of the invention is described as follows. FIGS. 7 and 8 show a camera which is arranged as the fourth embodiment. FIG. 7 is a block diagram showing the electric circuit of the camera. FIG. 8 is a flow chart showing the operation of the camera shown in FIG. 7.

Referring to FIG. 7, the camera is provided with a storage circuit 17 which is arranged such that, after shooting data which includes information designating the number of prints as "0" or "1" is automatically recorded in the magnetic storage part of the film by the automatic reset function when an abnormal shooting condition of the camera is detected by the abnormality detecting circuit 8, if the automatic reset cancel switch 16 is turned on, the storage circuit 17 is used to store information about the number of prints detected by the process of the step S100 and the location of the applicable frame.

With the exception of the above, all other parts are arranged in the same manner as the third embodiment shown in FIG. 5. These same parts are indicated by the same reference numerals as in FIG. 5 and are omitted from the following description. In the flow chart of FIG. 8, the same processes as those of the third embodiment shown in FIG. 6 are indicated by the same step numbers and are omitted from the following description, which is limited to processes which differ from the third embodiment.

Referring to FIG. 8, at a step 401, a check is made to find if the automatic reset cancel switch 16 is in an on-state. If so, the flow proceeds to a step S402 to store in the storage circuit 17 the information designating the number of prints as "1" or more and the location of the applicable frame, and then the flow comes to the step S114. If the result of the check made at the step S401 is negative, the flow comes directly to the step S114.

After the step S114 at which a check is made for the last frame of the film and the step S115 at which film rewinding begins, the flow comes to a step S403. At the step S403, a check is made to find if there is any frame for which the automatic reset cancel switch 16 has been turned on, i.e., if any data is stored in the storage circuit 17. If so, the flow comes to a step S404 to cause the perforation detecting circuit 9 to count the number of perforations of the film. At a step S405, a check is made to find if the film has been rewound to a frame for which the automatic reset cancel switch 16 has been turned on, i.e., to a frame for which the data is stored in the storage circuit 17. If so, the flow comes to a step S406 to cause the data stored in the storage circuit 17 to be magnetically recorded in the magnetic storage part of the film by the magnetic recording circuit 2. If not, the flow comes back to the step S404.

At a step S407, a check is made to find if the magnetic recording has been finished for all the frames for which the automatic reset cancel switch 16 has been turned on. If not, the flow comes back to the step S404 to repeat the steps S404, S405 and S406. If so, the flow proceeds to the step S117 to complete film rewinding.

As described above, the fourth embodiment is arranged to rewrite the information designating the number of prints as "1" or more when the camera is in process of film rewinding. The sequence of shooting processes thus can be simplified to enable the photographer to more easily secure a shutter opportunity.

Figure 9:
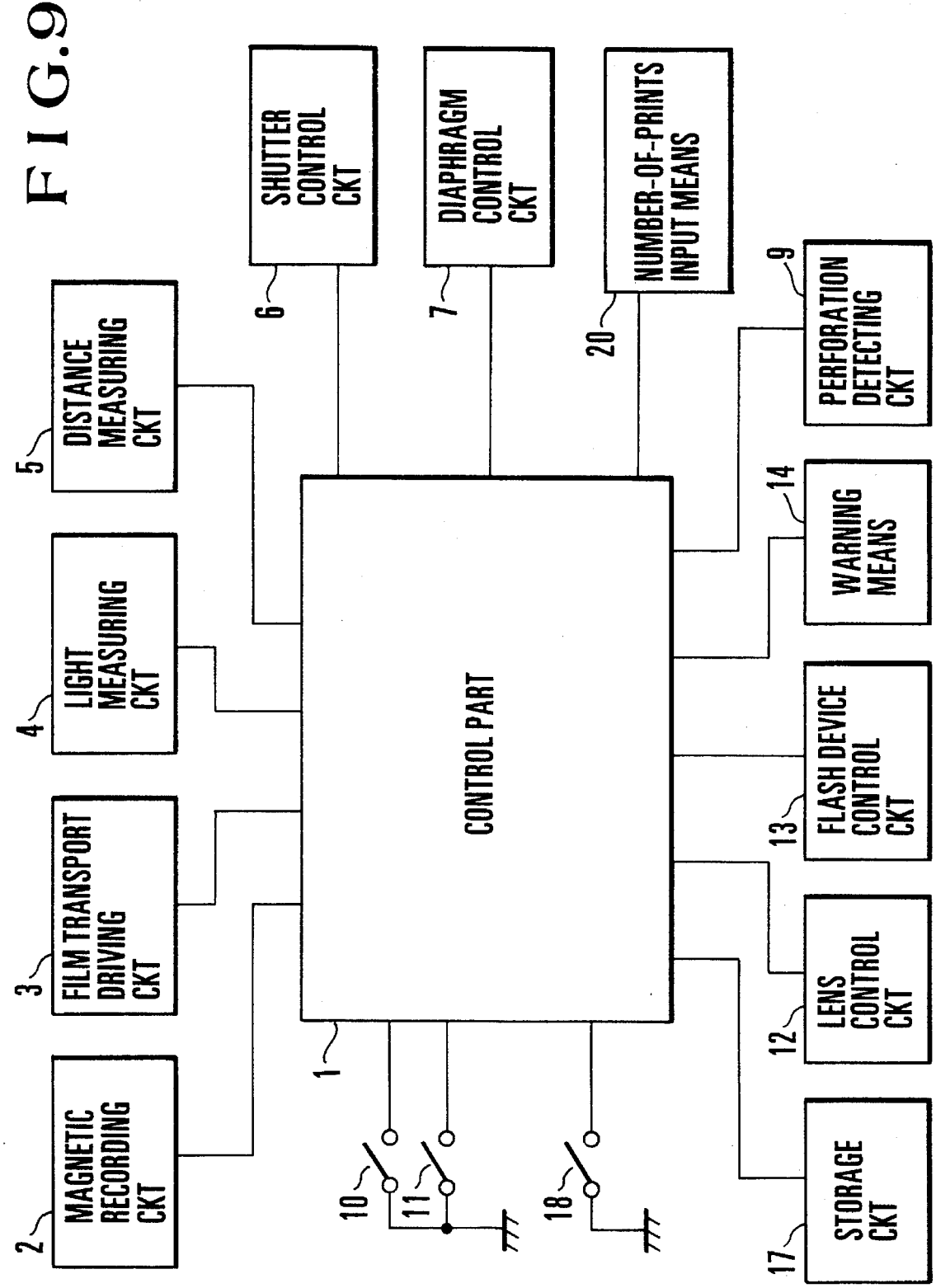
FIG. 9 is a block diagram showing the electric circuit of a camera arranged according to the invention as a fifth embodiment thereof.
Figure 10:
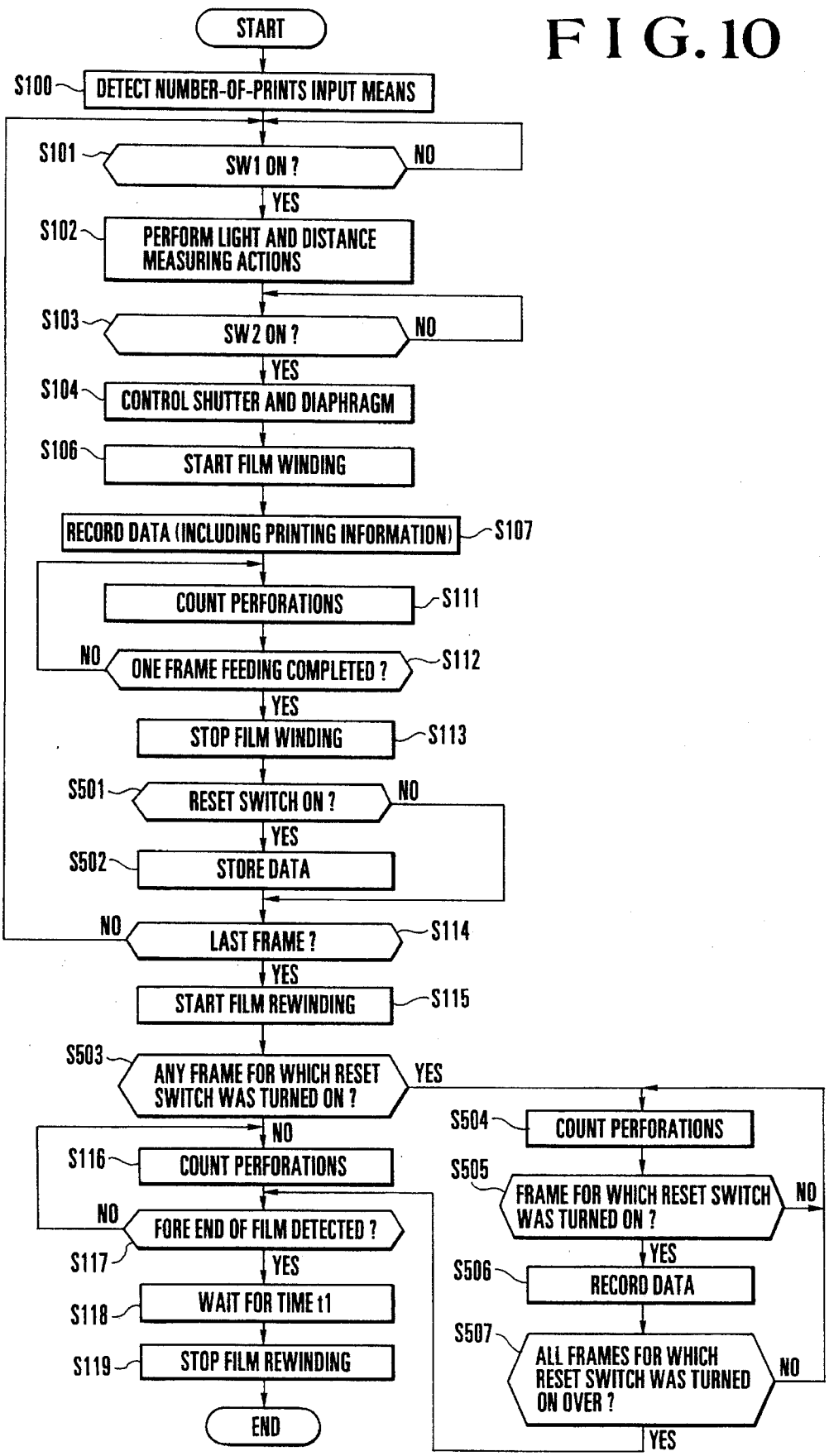
FIG. 10 is a flow chart showing the operation of the camera shown in FIG. 9.

A fifth embodiment of the invention is described below with reference to FIGS. 9 and 10. FIG. 9 is a block diagram showing the electric circuit of the camera which is the fifth embodiment. FIG. 10 is a flow chart showing the operation of the camera shown in FIG. 9.

The camera is provided with a reset switch 18 which is arranged to be turned on for any frame considered to be unnecessary for printing by the photographer. When the reset switch 18 is turned on, information designating the number of prints as "0" or "1" is magnetically recorded in the magnetic storage part of the film. In this case, with the reset switch 18 turned on, data which includes at least the information designating the number of prints as "0" or "1" and the location of the frame applicable to this designation are stored in the storage circuit 17. All other parts arranged in the same manner as those of each of the embodiments shown in FIGS. 1 and 7 are indicated by the same reference numerals and omitted from the following description. In the flow chart of FIG. 10, processes which are the same as those of the first embodiment shown in FIG. 2 are indicated by the same step numbers and are also omitted from the following description, which is limited to processes differing from those of the first embodiment.

In the case of the fifth embodiment, information designating the number of prints as "0" or "1" is recorded on the film if the reset switch 18 is turned on by the photographer for a desired frame. In this case, the flow of operation does not include the step S105 at which the abnormality detecting process is performed by the abnormality detecting circuit 8 and the process of automatically recording the information designating the number of prints as "0" or "1" is not performed.

Following the step S113 of bringing film winding to a stop after a series of release actions, the flow of operation comes to a step S501. At the step S501, a check is made to find if the reset switch 18 is in an on-state. If so, the flow comes to a step S502 to store data including at least the information designating the number of prints as "0" or "1" and the information indicating the location of the frame for which the reset switch 18 has been turned on, in the storage circuit 17. If not, the flow comes to the step S114.

If the film is found to have come to the last frame by the step S114, the flow comes to the step S115 to start film rewinding. At a next step S503, a check is made to find if there is any frame for which the reset switch 18 has been turned on, that is, to find if any data is stored in the storage circuit 17. If so, the flow comes to a step S504 to cause the perforation detecting circuit 9 to count the number of perforations of the film. At a step S505, a check is made to find if the film has been rewound to the frame for which the reset switch 18 has been turned on to store data in the storage circuit 17. If so, the flow comes to a step S506 to magnetically record the data in the magnetic storage part of the film. If not, the flow comes back to the step S504.

At a next step S507, a check is made to find if magnetic recording has been completed for all the frames for which the reset switch 18 has been turned on. If not, the flow comes back to the step S504 to repeat the steps S504, S505 and S506. If so, the flow proceeds to the step S117 to finish the film rewinding action.

The fifth embodiment is thus arranged to enable the photographer with the reset switch 18 to select a frame or frames for which printing is not required and to record the information designating the number of prints as "0" or "1".

Figure 11:
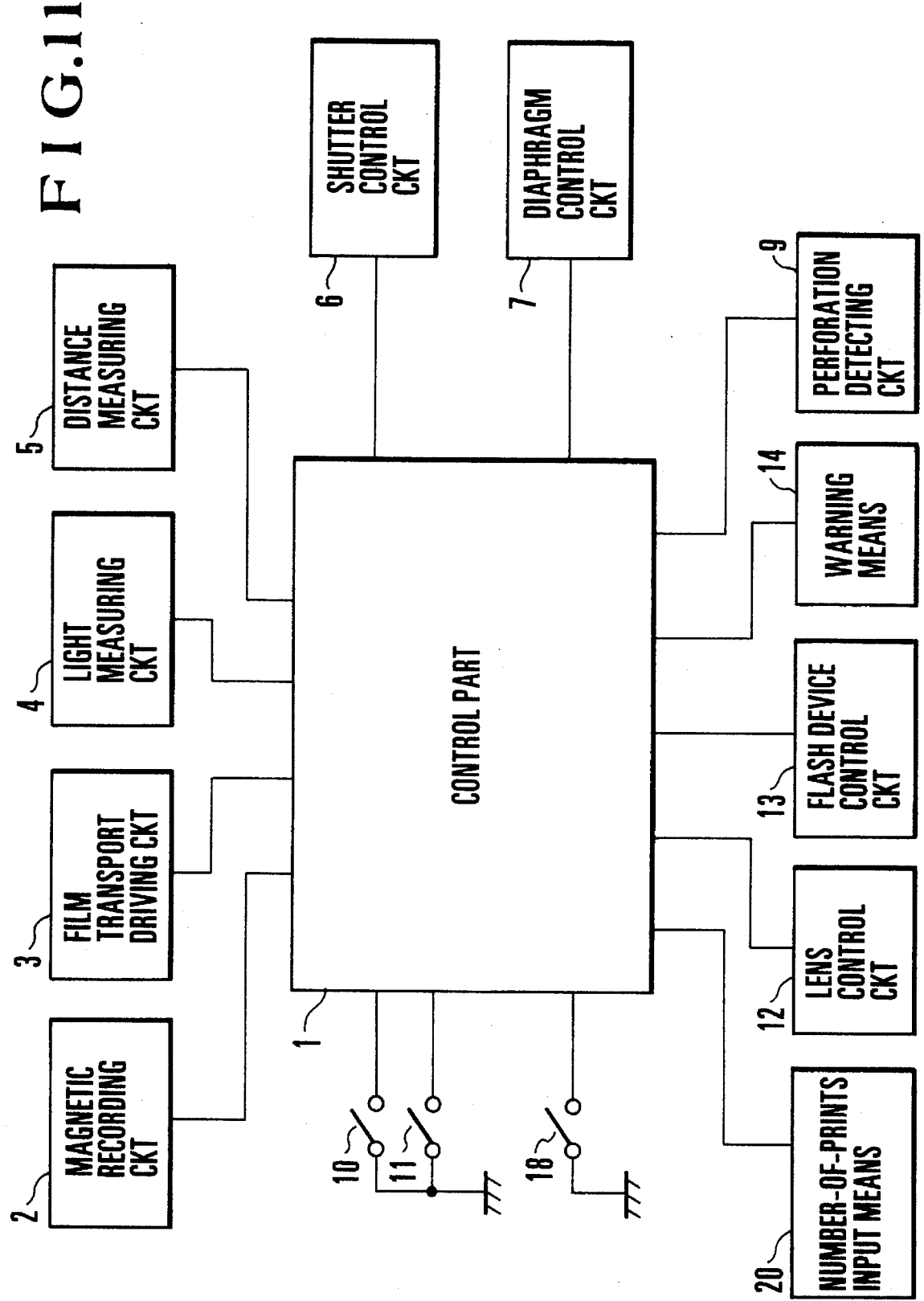
FIG. 11 is a block diagram showing the electric circuit of a camera arranged according to the invention as a sixth embodiment thereof.
Figure 12:
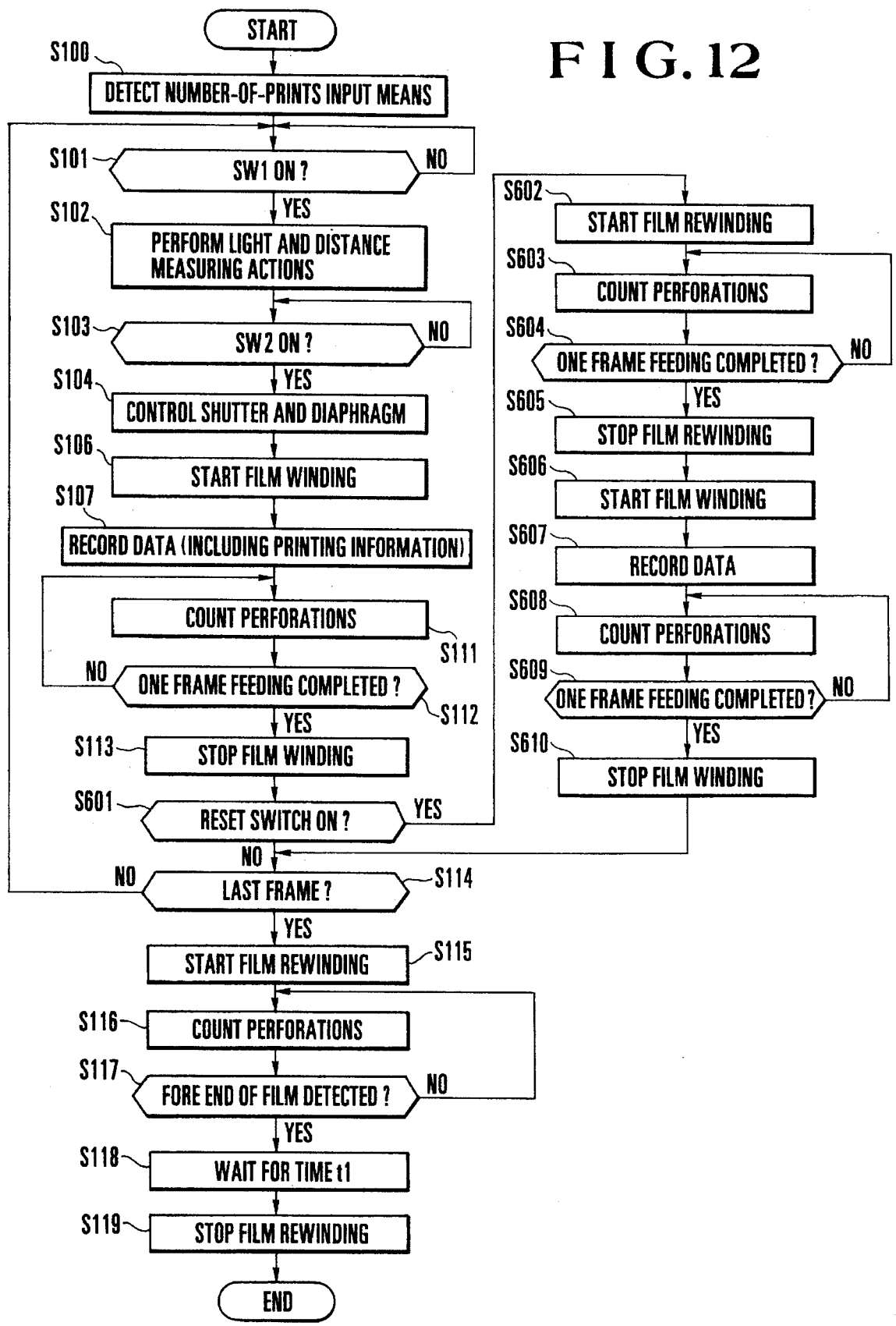
FIG. 12 is a flow chart showing the operation of the camera shown in FIG. 11.

A sixth embodiment of the invention is described as follows: FIGS. 11 and 12 show a camera which is arranged as the sixth embodiment of the invention. FIG. 11 is a block diagram showing the electric circuit of the camera. FIG. 12 is a flow chart showing the operation of the camera. The electric circuit of FIG. 11 is arranged in the same manner as the circuit arrangement shown in FIG. 9 except that the storage circuit 17 in FIG. 9 is excluded from FIG. 11 and, therefore, all the parts that have already been described are omitted from the following description. The operation of the sixth embodiment is described with reference to FIG. 12. In FIG. 12, the same processes as those of the fifth embodiment shown in FIG. 10 are indicated by the same step numbers and the details of them are omitted from the following description, which is limited to processes which differ from FIG. 10.

Referring to FIG. 12, after the film winding process of the step S113 is performed with a series of release actions having been carried out, the flow comes to a step S601. At the step S601, a check is made to find if the reset switch 18 is in an on-state. If so, the flow of operation comes to a step S602 to cause the film transport driving circuit 3 to drive the film transport motor to begin film rewinding.

At a next step S603, the perforation detecting circuit 9 is caused to count the perforations of the film. At a step S604, a check is made to find if the number of perforations corresponding to one frame portion of the film has been counted. If so, the flow comes to a step S605 to cause the film transport driving circuit 3 to bring the film rewinding process to a stop by stopping the film transport motor. If not, the flow comes back to the step S603. At a step S606, the film transport driving circuit 3 is caused to drive the film transport motor to begin film winding. At a step S607, among the data recorded by the recording process of the step S107, the information designating the number of prints as "1" or more detected at the step S100 is changed to information designating the number of prints as "0" or "1", and the information thus changed is recorded in the magnetic storage part of the film by the magnetic recording circuit 2.

At a step S608, the perforation detecting circuit 9 is caused to count the number of perforations of the film. At a step S609, a check is made to find if the number of perforations which corresponds to one frame has been counted. If not, the flow comes back to the step S608. If so, the flow comes to a step S610 to cause the film transport driving circuit 3 to bring the film winding process to a stop by stopping the film transport motor. After the step S610, the flow comes to the step S114 to proceed with the process of detecting the last frame.

Further, in a case where the result of the check made at the step S601 is negative, the flow comes to the step S114 to proceed with the process of film rewinding through the check for the last frame.

Therefore, in the case of the sixth embodiment, the data recording processes of the steps 503 to S507 which are executed by the fifth embodiment during the film rewinding process following the data storing process of the step S502 are not executed. In this case, the data recording is carried out after one frame portion of the film is rewound as shown in the steps S601 to S610.

As described above, the sixth embodiment differs from the fifth embodiment in that the sixth embodiment is arranged to cause the information designating the number of prints as "1" or more to be changed to information designating it as "0" or "1" after one frame portion of the film is rewound. The arrangement obviates the necessity of provision of the storage circuit 17. Other advantages of the sixth embodiment are the same as those of the fifth embodiment.

Figure 13:
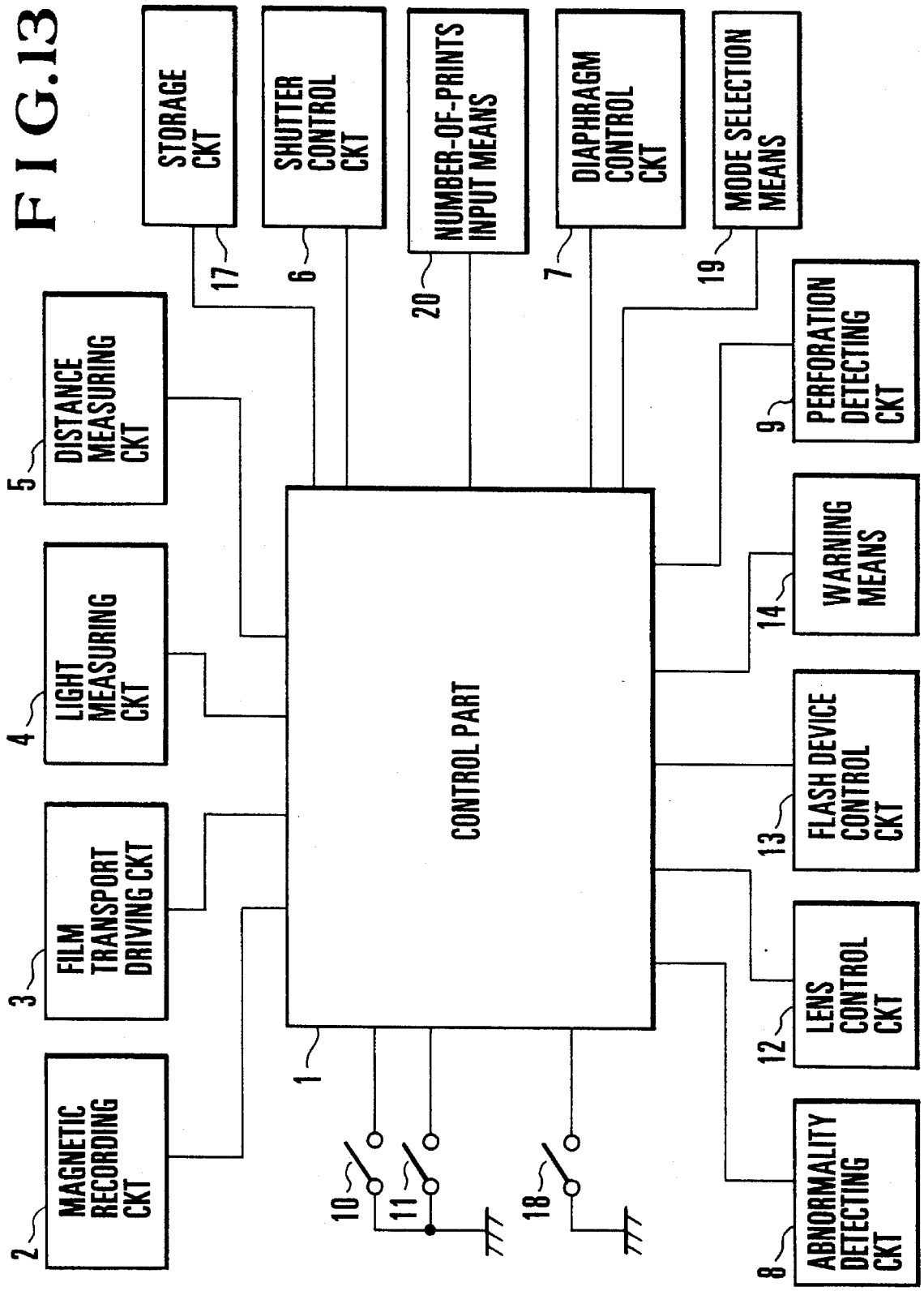
FIG. 13 is a block diagram showing the electric circuit of a camera arranged according to the invention as a seventh embodiment thereof.
Figure 14:
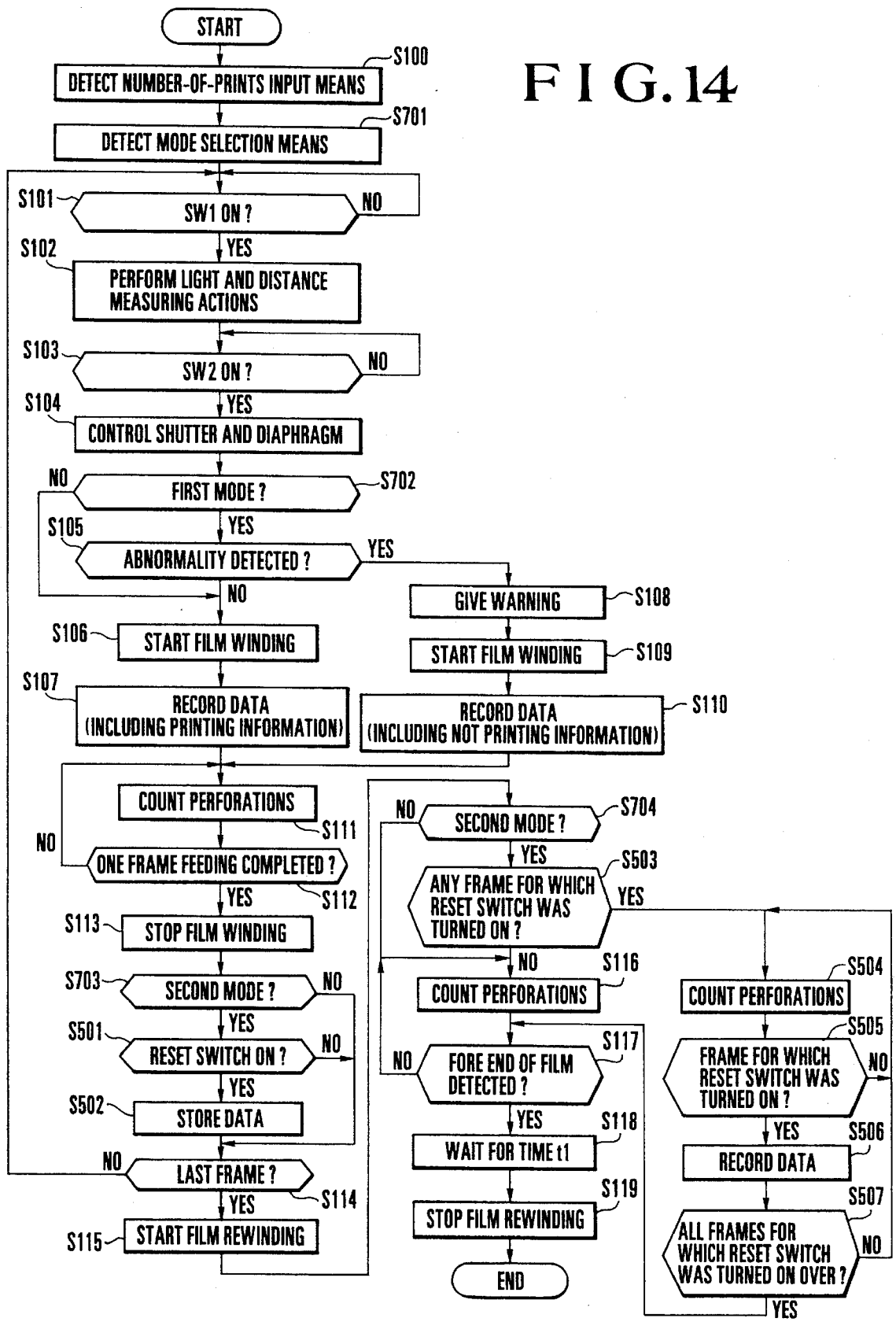
FIG. 14 is a flow chart showing the operation of the camera shown in FIG. 13.

A seventh embodiment of the invention is described as follows: FIGS. 13 and 14 show a camera which is arranged as the seventh embodiment. FIG. 13 is a block diagram showing the electric circuit of the camera. FIG. 14 is a flow chart showing the operation of the camera.

Referring to FIG. 13, the seventh embodiment is provided with a mode selection means 19. The mode selection means 19 is arranged to select one of first and second modes. In the first mode, the information designating the number of prints as "0" or "1" is recorded on the film if any abnormal shooting condition is detected by the abnormality detecting circuit 8. In the second mode, the information designating the number of prints as "0" or "1" is recorded on the film if the reset switch 18 is turned on. With the exception of the provision of the mode selection means 19, all the parts are arranged in the same manner as other embodiments described in the foregoing. The same parts are indicated by the same reference numerals, and a repeated description of them is omitted from the following description.

The operation of the seventh embodiment is described below with reference to FIG. 14 which is a flow chart. All the processes that are the same as those of the flow charts shown in FIGS. 2 and 10 are indicated by the same step numbers, and a repeated description of such steps is omitted from the following description, which is limited to such parts that differ from other flow charts.

Following the process of the step S100, the flow of operation comes to a step S701. At the step S701, the state of the mode selection means 19 is detected before the step S102. After a series of release actions, the flow comes to a step S702. At the step S702, a check is made to find if the state of the mode selection means 19 detected by the step S701 is the first mode. If so, the flow comes to the step S105 of detecting an abnormality. If it is found to be the second mode, the flow comes to the step S106.

After the step S113 of bringing film winding to a stop, the flow comes to a step S703. At the step S703, a check is made to find if the state of the mode selection means 19 detected by the step S701 is the second mode. If so, the flow proceeds to the step S501 of making a check for the on-state of the reset switch 18. If the state of the mode selection means is found to be the first mode, the flow jumps to the step S114 of making a check for the last frame, skipping the step S501 of making a check for the state of the reset switch 18 and the step S502 of executing the data storing process.

At the step S115, the process of film rewinding is caused to begin, and the flow comes to a step S704. At the step S704, a check is made for the second mode in the same manner as the step S703. If the state of the mode selection means 19 is found to be the second mode, the flow comes to the step S503 of making a check for a frame for which the reset switch 18 has been turned on and also to other steps subsequent to the step S503. If the state of the mode selection means 19 is found to be the first mode, the flow proceeds to the step S116.

The seventh embodiment is thus arranged to permit selection of the first mode of automatic processing or the second mode which can be selected as desired according to a switching input. The arrangement of the seventh embodiment thus enables the photographer to select either the first mode in which preparation of useless prints can be automatically prevented or the second mode in which any frame not wanted to be printed can be selected as desired to prevent preparation of useless prints.

What is claimed is:

1. A camera having magnetic recording means arranged to magnetically record information through a magnetic head in a magnetic recording part of a film, comprising:

a) state detecting means for generating an output when a state of shooting become a predetermined state; and b) recording control means for causing said magnetic recording means to record, in the magnetic recording part, information designating the number of prints as "0" or "1", in response to the output of said state detecting means.

2. A camera according to claim 1, further comprising number-of-prints designating means for designating the number of prints as an arbitrary number, wherein said recording control means is arranged to cause said magnetic recording means to record, in the magnetic recording part, information indicating the number of prints designated by said number-of-prints designating means, if no output is generated by said state detecting means.

3. A camera according to claim 2, wherein the magnetic recording part is provided for each frame of the film, and the information designating the number of prints as "0" or "1" or the information indicating the designated number of prints is recorded in the magnetic recording part for each frame.

4. A camera according to claim 3, further comprising inhibiting means for inhibiting said recording control means from causing the information designating the number of prints as "0" or "1" to be recorded in response to the output of said state detecting means.

5. A camera having magnetic recording means arranged to magnetically record information through a magnetic head in a magnetic recording part of a film, comprising:

a) state detecting means for generating an output when a state of shooting becomes a predetermined state;

b) designating means for designating the number of prints as an arbitrary number;

c) recording control means having a first mode for causing said magnetic recording means to record, in the magnetic recording part, information designating the number of prints as "0" or "1" in response to the output of said state detecting means, and a second mode for causing said magnetic recording means to record, in the magnetic recording part, information corresponding to the arbitrary number of prints designated by said designating means if no output is generated by said state detecting means; and d) manual operation means for causing said recording control means to operate in the second mode to record information in the magnetic recording part in which information has been recorded in the first mode.

6. A camera according to claim 5, wherein the magnetic recording part is provided for each frame of the film, and the information designating the number of prints as "0" or "1" or the information indicating the designated number of prints is recorded in the magnetic recording part for each frame.

7. A camera according to claim 6, wherein, after information is recorded in the magnetic recording part of a frame in the first mode at the time of film winding, said manual operation means causes information to be recorded in the magnetic recording part of the frame in the second mode when a one-frame winding action is performed again on the film after one-frame rewinding.

8. A camera having magnetic recording means arranged to magnetically record information through a magnetic head in a magnetic recording part provided at each of frames of a film, comprising:

a) number-of-prints designating means for designating the number of prints as an arbitrary number;

b) control means for causing said magnetic recording means to record information indicating the arbitrary number of prints individually designated by said number-of-prints designating means in the magnetic recording part provided at each of the frames of the film; and c) cancel means for cancelling information recorded under the control of said control means, said cancel means being arranged to selectively cancel the information recorded for any arbitrary frame.

9. A camera according to claim 8, wherein said cancel means is arranged to cancel the recorded information by recording information designating the number of prints as "0" or "1".

10. A camera having magnetic recording means arranged to magnetically record information through a magnetic head in a magnetic recording part provided at each of frames of a film, comprising:

a) number-of-prints designating means for designating the number of prints as an arbitrary number;

b) state detecting means for generating an output when a state of shooting becomes a predetermined state;

c) inhibiting means; and d) control means for causing said magnetic recording means to record information indicating the number of prints designated by said number-of-prints designating means in the magnetic recording part of each frame, said control means being arranged to inhibit or cancel the recording of the information indicating the number of prints designated by said number-of-prints designating means in response to the output of said state detecting means or in response to an operation performed on said inhibiting means.

11. A camera having magnetic recording means arranged to magnetically record information through a magnetic head in a magnetic recording part provided at each of frames of a film, comprising:

a) number-of-prints designating means for designating the number of prints as an arbitrary number;

b) state detecting means for generating an output when a state of shooting becomes a predetermined state; and c) control means for causing said magnetic recording means to record information indicating the number of prints designated by said number-of-prints designating means in the magnetic recording part of each frame, said control means being arranged to inhibit the recording of the information in response to the output of said state detecting means.

12. A camera according to claim 1, wherein said state detecting means is arranged to generate an output when a shooting state of the camera becomes abnormal.

13. A camera according to claim 5, wherein said state detecting means is arranged to generate an output when a shooting state of the camera becomes abnormal.

14. A camera according to claim 10, wherein said state detecting means is arranged to generate an output when a shooting state of the camera becomes abnormal.

15. A camera according to claim 11, wherein said state detecting means is arranged to generate an output when a shooting state of the camera becomes abnormal.

16. A camera according to claim 12, wherein said abnormal state is a state of having a camera shake.

17. A camera according to claim 13, wherein said abnormal state is a state of having a camera shake.

18. A camera according to claim 14, wherein said abnormal state is a state of having a camera shake.

19. A camera according to claim 15, wherein said abnormal state is a state of having a camera shake.

* * * * *

UNITED STATES PATENT AND TRADEMARK OFFICE
CERTIFICATE OF CORRECTION

PATENT NO. : 5,574,520

DATED : November 12, 1996

INVENTOR(S): Masaaki Ishihara

It is certified that error appears in the above-identified patent and that said Letters Patent is hereby corrected as shown below:

Col. 5, line 56, after "been" insert -- in --.

Col. 5, line 58, after "been" insert -- in --.

Col. 9, lines 62-63, change "provision of" to -- providing --.

Col. 10, line 13, change "provision of" to -- providing --.

Col. 11, line 44, after "mode" delete "to".

Signed and Sealed this

Twenty-ninth Day of April, 1997

Attest:

BRUCE LEHMAN

Attesting Officer

Commissioner of Patents and Trademarks